(12) United States Patent
Ghandour et al.

(10) Patent No.: US 11,859,545 B1
(45) Date of Patent: Jan. 2, 2024

(54) AIRCRAFT PROPULSION SYSTEM WITH VARIABLE AREA

(71) Applicant: Rohr, Inc., Chula Vista, CA (US)

(72) Inventors: Imad D. Ghandour, San Diego, CA (US); Jihad I. Ramlaoui, Chula Vista, CA (US); Timothy Gormley, Bonita, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 18/102,501

(22) Filed: Jan. 27, 2023

(51) Int. Cl.
*F02C 7/042* (2006.01)
*F02C 3/06* (2006.01)

(52) U.S. Cl.
CPC ............... *F02C 7/042* (2013.01); *F02C 3/06* (2013.01); *F05D 2220/323* (2013.01); *F05D 2240/12* (2013.01)

(58) Field of Classification Search
CPC .. F02C 7/04; F02C 7/042; F02C 7/045; F02C 3/06; F05D 2220/323; F05D 2240/12
See application file for complete search history.

(56) References Cited

U.S. PATENT DOCUMENTS

| | | | |
|---|---|---|---|
| 4,132,240 A | 1/1979 | Frantz | |
| 5,014,933 A * | 5/1991 | Harm | B64D 33/02 181/220 |
| 10,308,368 B2 * | 6/2019 | Pastouchenko | F04D 29/682 |
| 11,390,393 B2 | 7/2022 | Cochran | |
| 11,441,482 B2 | 9/2022 | Lacko | |

* cited by examiner

*Primary Examiner* — Steven M Sutherland
(74) *Attorney, Agent, or Firm* — Getz Balich LLC

(57) ABSTRACT

An assembly for an aircraft includes a variable area inlet for an aircraft propulsion system. The variable area inlet extends along a longitudinal centerline. The variable area inlet includes an inlet structure, an inlet door, an inner inlet passage, and an outer inlet passage. The inlet door is configured to axially translate from a closed position to an open position along the longitudinal centerline. The inlet door is configured to close the outer inlet passage when the inlet door is in the closed position. The inlet door is configured to open the outer inlet passage when the inlet door is in the open position. The inner inlet passage extends into the variable area inlet from a leading edge of the inlet structure. The outer inlet passage extends through the inlet structure to the inner inlet passage.

19 Claims, 6 Drawing Sheets

AIRCRAFT PROPULSION SYSTEM WITH VARIABLE AREA

BACKGROUND

1. Technical Field

This disclosure relates generally to an aircraft propulsion system and, more particularly, to an inlet for the aircraft propulsion system with a variable airflow inlet area.

2. Background Information

An aircraft propulsion system may include an inlet structure and a gas turbine engine. The inlet structure directs air into the gas turbine engine. Some known inlet structures include a variable airflow inlet area for tailoring a mass flow of the air entering the gas turbine engine. While these known inlet structures have various advantages, there is still room in the art for improvement. There is a need in the art therefore for an improved inlet assembly with a variable airflow inlet area.

SUMMARY

It should be understood that any or all of the features or embodiments described herein can be used or combined in any combination with each and every other feature or embodiment described herein unless expressly noted otherwise.

According to an aspect of the present disclosure, an assembly for an aircraft includes a variable area inlet for an aircraft propulsion system. The variable area inlet extends along a longitudinal centerline. The variable area inlet includes an inlet structure, an inlet door, an inner inlet passage, and an outer inlet passage. The inlet door is configured to axially translate from a closed position to an open position along the longitudinal centerline. The inlet door is configured to close the outer inlet passage when the inlet door is in the closed position. The inlet door is configured to open the outer inlet passage when the inlet door is in the open position. The inner inlet passage extends into the variable area inlet from a leading edge of the inlet structure. The outer inlet passage extends through the inlet structure to the inner inlet passage.

In any of the aspects or embodiments described above and herein, the inlet door may be downstream of the leading edge.

In any of the aspects or embodiments described above and herein, the inlet door may be configured to cover an inlet orifice into the outer inlet passage when the inlet door is in the closed position and uncover the inlet orifice when the inlet door is in the open position.

In any of the aspects or embodiments described above and herein, an inner inlet orifice into the inner inlet passage may be formed by the inlet structure at the leading edge and an outer inlet orifice into the outer inlet passage may be formed by the inlet structure downstream of the leading edge.

In any of the aspects or embodiments described above and herein, the inner inlet passage may extend axially into the variable area inlet from the leading edge.

In any of the aspects or embodiments described above and herein, the outer inlet passage may extend radially through the inlet structure to the inner inlet passage.

In any of the aspects or embodiments described above and herein, the inlet door may include a door exterior side extending circumferentially about the longitudinal centerline.

In any of the aspects or embodiments described above and herein, the inlet structure may include an inlet exterior side and the door exterior side may be disposed contiguous with the inlet exterior side with the inlet door in the closed position.

In any of the aspects or embodiments described above and herein, the inlet door may include a leading edge and a trailing edge and the leading edge may contact the inlet structure with the inlet door in the closed position.

In any of the aspects or embodiments described above and herein, the leading edge may be axially displaced from the outer inlet passage with the inlet door in the open position.

In any of the aspects or embodiments described above and herein, the assembly may further include a gas turbine engine including a core flowpath. The core flowpath may be configured to receive air from the inner inlet passage and the outer inlet passage when the inlet door is in the open position.

In any of the aspects or embodiments described above and herein, the assembly may further include a gas turbine engine including a bypass flowpath. The bypass flowpath may be configured to receive air from the inner inlet passage and the outer inlet passage when the inlet door is in the open position.

According to another aspect of the present disclosure, an assembly for an aircraft includes a variable area inlet for an aircraft propulsion system. The variable area inlet extends circumferentially about a longitudinal centerline. The variable area inlet includes an inlet structure, an inlet door, an inner inlet passage and a first outer inlet passage. The inlet door is configured to translate between a closed position and an open position. The inlet door is configured to close the first outer inlet passage when the inlet door is in the closed position. The inlet door is configured to open the first outer inlet passage when the inlet door is in the open position. The inner inlet passage extends axially into the variable area inlet. The first outer inlet passage extends radially through the inlet structure.

In any of the aspects or embodiments described above and herein, the variable area inlet may include a plurality of outer inlet passages. The plurality of outer inlet passages may include the first outer inlet passage. The plurality of outer inlet passages may be disposed circumferentially about the longitudinal centerline and the inner inlet passage in an array. The inlet door may be configured to close each of the plurality of outer inlet passage when the inlet door is in the closed position. The inlet door may be configured to open each of the plurality of outer inlet passage when the inlet door is in the open position.

In any of the aspects or embodiments described above and herein, the inlet door may extend circumferentially about the longitudinal centerline.

In any of the aspects or embodiments described above and herein, the inlet door may extend circumferentially about the inner inlet passage.

According to another aspect of the present disclosure, an assembly for an aircraft includes a variable area inlet for an aircraft propulsion system. The variable area inlet extends along a longitudinal centerline. The variable area inlet includes an inlet structure, an inlet door, an inner inlet passage, and an outer inlet passage. The inlet door includes a leading edge and a trailing edge. The inlet door is configured to axially translate from a closed position to an open position along the longitudinal centerline. The leading edge is disposed in contact with the inlet structure in the closed position. The leading edge is axially displaced from the outer inlet passage in the open position. The inner inlet passage extends into the variable area inlet from a leading edge of the inlet structure. The outer inlet passage extends through the inlet structure to the inner inlet passage.

In any of the aspects or embodiments described above and herein, an inner inlet orifice into the inner inlet passage may be formed by the inlet structure at the leading edge and an outer inlet orifice into the outer inlet passage may be formed by the inlet structure downstream of the leading edge.

In any of the aspects or embodiments described above and herein, the inner inlet passage may extend axially into the variable area inlet from the leading edge.

In any of the aspects or embodiments described above and herein, the outer inlet passage may extend radially through the inlet structure to the inner inlet passage.

The present disclosure, and all its aspects, embodiments and advantages associated therewith will become more readily apparent in view of the detailed description provided below, including the accompanying drawings.

DETAILED DESCRIPTION

Figure 1:
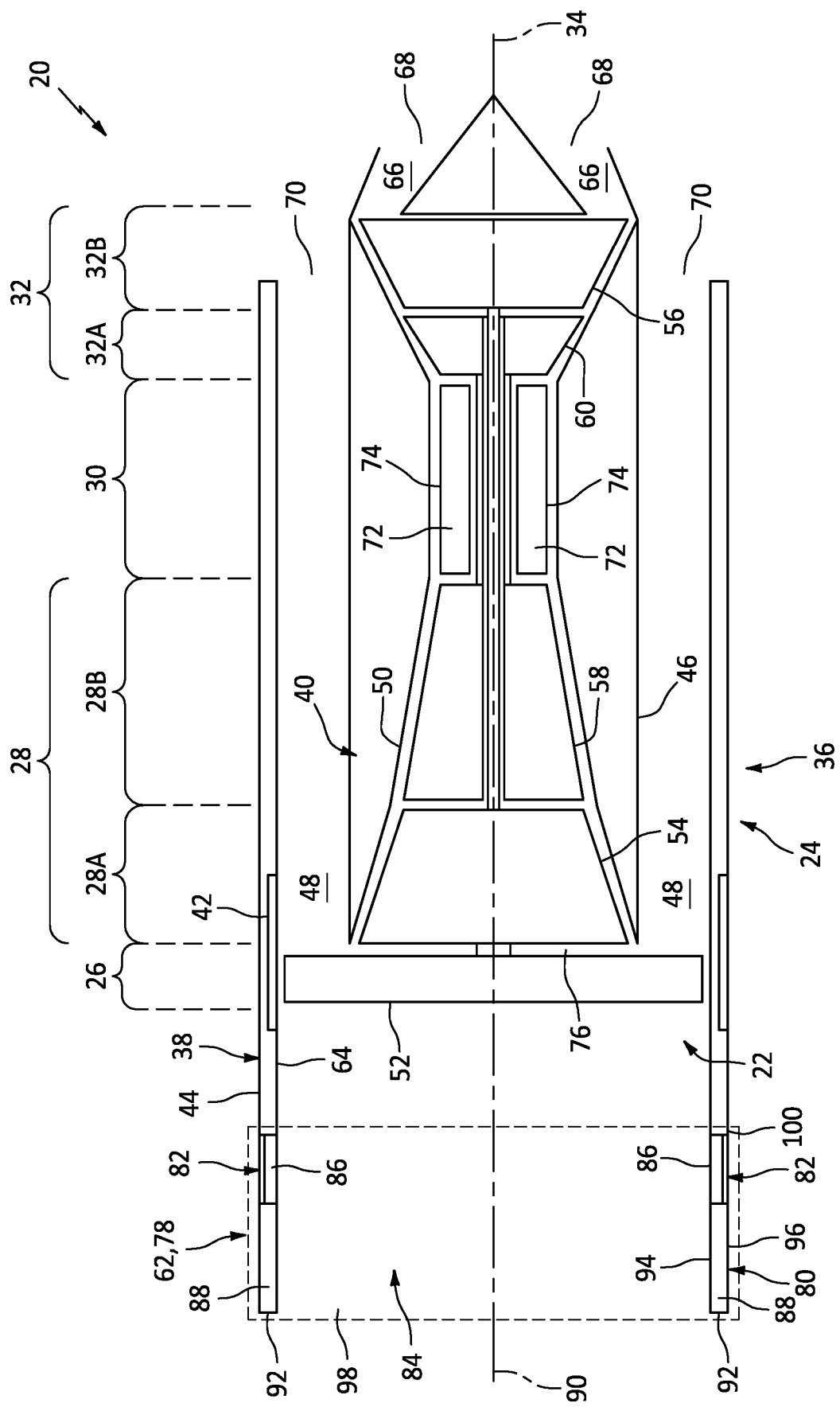
FIG. 1 is a schematic illustration of an aircraft propulsion system with variable area inlet door in a closed position, in accordance with one or more embodiments of the present disclosure.

FIG. 1 is schematic illustration of a propulsion system 20 for an aircraft. Briefly, the aircraft may be an airplane, a drone (e.g., an unmanned aerial vehicle (UAV)) or any other manned or unmanned aerial vehicle. The aircraft propulsion system 20 includes a gas turbine engine 22 and a nacelle 24.

The gas turbine engine 22 may be configured as a turbofan engine. The gas turbine engine 22 of FIG. 1, for example, includes a fan section 26, a compressor section 28, a combustor section 30 and a turbine section 32. The compressor section 28 may include a low-pressure compressor (LPC) section 28A and a high-pressure compressor (HPC) section 28B. The turbine section 32 may include a high-pressure turbine (HPT) section 32A and a low-pressure turbine (LPT) section 32B.

The engine sections 26, 28, 30, and 32 may be arranged sequentially along an axial centerline 34 (e.g., a rotational axis) of the gas turbine engine 22 within an aircraft propulsion system housing 36. This propulsion system housing 36 includes an outer housing structure 38 and an inner housing structure 40.

The outer housing structure 36 includes an outer case 42 (e.g., a fan case) and an outer structure 44 of the nacelle 24; e.g., an outer nacelle structure. The outer case 42 houses at least the fan section 26. The outer nacelle structure 44 houses and provides an aerodynamic cover for the outer case 42. The outer nacelle structure 44 also covers a portion of an inner structure 46 of the nacelle 24; e.g., an inner nacelle structure, which may also be referred to as an inner fixed structure (IFS). More particularly, the outer nacelle structure 44 axially overlaps and extends circumferentially about (e.g., completely around) the inner nacelle structure 46. The outer nacelle structure 44 and the inner nacelle structure 46 thereby at least partially or completely form a (e.g., annular) bypass flowpath 48 within the aircraft propulsion system 20.

The inner housing structure 40 includes an inner case 50 (e.g., a core case) and the inner nacelle structure 46. The inner case 50 houses one or more of the engine sections 26, 28, 30, and 32, which engine sections 26, 28, 30, and 32 may be collectively referred to as an engine core. The inner nacelle structure 46 houses and provides an aerodynamic cover for the inner case 50.

Each of the engine sections 26, 28A, 28B, 32A, and 32B includes a bladed rotor 52, 54, 56, 58, and 60. The fan rotor 52 and the LPC rotor 54 are connected to and driven by the LPT rotor 56 through a low-speed shaft. The HPC rotor 58 is connected to and driven by the HPT rotor 60 through a high-speed shaft. The shafts are rotatably supported by a plurality of bearings (not shown). Each of these bearings is connected to the aircraft propulsion system housing 36 (e.g., the inner case 50) by at least one stationary structure such as, for example, an annular support strut.

During operation, air enters the aircraft propulsion system 20 through an aircraft propulsion system inlet structure 62. This air is directed through an inlet duct 64 (e.g., a fan duct in the fan section 26) and into a (e.g., annular) core flowpath 66 and the bypass flowpath 48. The core flowpath 66 extends axially along the axial centerline 34 within the propulsion system 20, through the engine sections 28, 30, and 32, to a core nozzle outlet 68, where the core flowpath 66 is radially within the inner case 50. The bypass flowpath 48 extends axially along the axial centerline 34 within the propulsion system 20 to a bypass nozzle outlet 70, where the bypass flowpath 48 is radially between the outer nacelle structure 44 and the inner nacelle structure 46. The air within the core flowpath 66 may be referred to as "core air." The air within the bypass flowpath 48 may be referred to as "bypass air."

The core air is compressed by the LPC rotor 54 and the HPC rotor 58 and directed into a combustion chamber 72 of a combustor 74 in the combustor section 30. Fuel is injected into the combustion chamber 72 through one or more fuel injectors and mixed with the compressed core air to provide a fuel-air mixture. This fuel-air mixture is ignited and combustion products thereof flow through and sequentially cause the HPT rotor 60 and the LPT rotor 56 to rotate. The rotation of the HPT rotor 60 and the LPT rotor 56 respectively drive rotation of the HPC rotor 58 and the LPC rotor 54 and, thus, compression of the air received from a core airflow inlet 76. The rotation of the LPT rotor 56 also drives rotation of the fan rotor 52, which fan rotor 52 propels bypass air through and out of the bypass flowpath 48. The propulsion system 20 of the present disclosure, however, is not limited to the exemplary gas turbine engine configuration described above.

Optimal mass flow requirements of the air entering the propulsion system 20 through the aircraft propulsion system inlet structure 62 may change depending upon one or more parameters. These parameters may include, but are not limited to, modes of operation, aircraft maneuvers, and operating conditions. For example, where the aircraft flies at supersonic speeds, a first mass flow of the air may be directed through the aircraft propulsion system inlet structure 62 into the propulsion system 20. When the aircraft flies at subsonic speeds, a second mass flow of the air may be directed through the aircraft propulsion system inlet structure 62 into the propulsion system 20, where the second mass flow is greater than the first mass flow.

Figure 2:
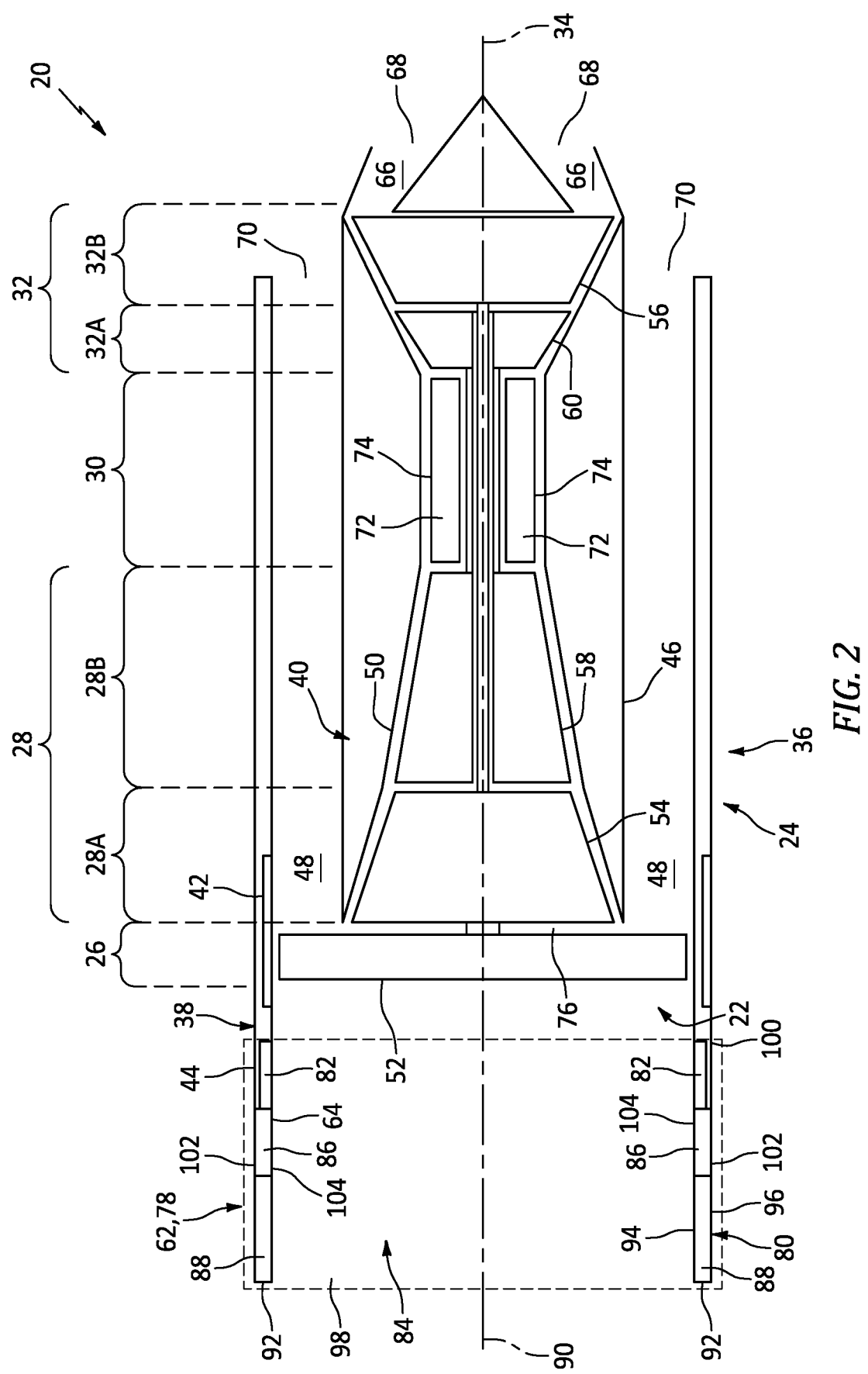
FIG. 2 is a schematic illustration of the aircraft propulsion system with the variable area inlet door in an open position, in accordance with one or more embodiments of the present disclosure.

To accommodate the changing mass flow requirements for the propulsion system 20, the aircraft propulsion system inlet structure 62 is configured as a variable area inlet 78. Referring to FIG. 2, this variable area inlet 78 includes a stationary inlet structure 80, a movable (e.g., translatable) inlet door 82, an inner (e.g., central, primary) inlet passage 84, and one or more outer (e.g., side, auxiliary) inlet passages 86.

Referring to FIGS. 1 and 2, the inlet structure 80 may be configured as a duct or another tubular body. The inlet structure 80 of FIGS. 1 and 2, for example, has a tubular sidewall 88. The inlet structure 80 and its sidewall 88 extend longitudinally along a longitudinal centerline 90 of the variable area inlet 78 to a leading edge 92 of the variable area inlet 78 (e.g., the inlet structure 80). The longitudinal centerline 90 may be an extension of or coaxial with the axial centerline 34. The inlet structure 80 and its sidewall 88 extend circumferentially about (e.g., completely around) around the longitudinal centerline 90. The inlet structure 80 and its sidewall 88 extend radially between and to an inner side 94 of the inlet structure 80 and an outer side 96 of the inlet structure 80.

Figure 3B:
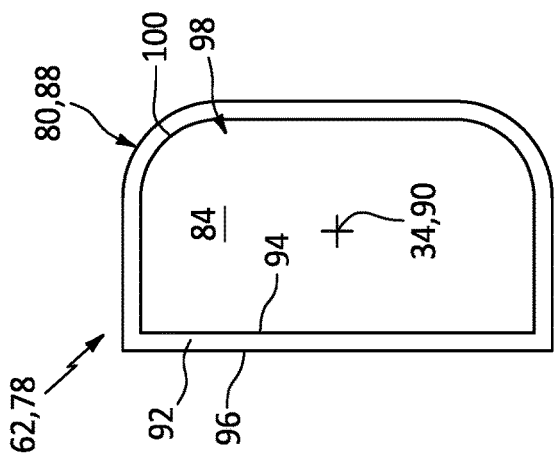
FIGS. 3A-C are end view illustrations of a variable area inlet with various inner inlet orifice geometries, in accordance with one or more embodiments of the present disclosure.
Figure 3A:
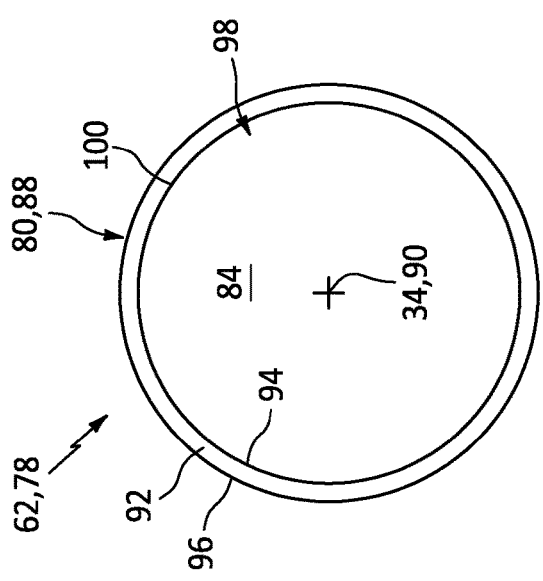
Figure 3C:
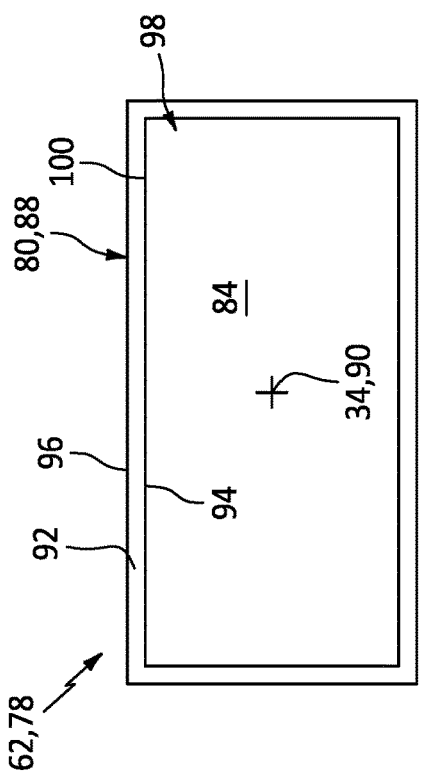

The inner inlet passage 84 extends longitudinally along the longitudinal centerline 90 within (e.g., through) the variable area inlet 78 and its inlet structure 80 from an inner inlet orifice 98 into the inner inlet passage 84 towards the gas turbine engine 22 and its fan section 26 (e.g., to the inlet duct 64). The inner inlet passage 84 of FIGS. 1 and 2, for example, is configured as (or otherwise includes) an interior bore formed within the inlet structure 80 by the inlet structure inner side 94. The inner inlet orifice 98 is disposed at (e.g., on, adjacent, or proximate) the leading edge 92. The inner inlet orifice 98 of FIGS. 1 and 2, for example, is formed by an inner skin of an inlet lip (e.g., a nose lip) of the inlet structure 80 at the leading edge 92. Referring to FIGS. 3A-C, the inner inlet orifice 98 has an outer perimeter 100 (e.g., an outer periphery of a cross-sectional geometry) when viewed in a reference plane, for example, perpendicular to the longitudinal centerline 90. Referring to FIG. 3A, the outer perimeter 100 may have curvilinear shape; e.g., circular shape, oval shape, a splined ring shape, etc. Referring to FIG. 3B, the outer perimeter 100 may alternatively have a D shape; e.g., a partially curvilinear and a partially polygonal shape. Referring to FIG. 3C, the outer perimeter 100 may alternatively be polygonal shaped. The present disclosure, however, is not limited to the foregoing exemplary inner inlet orifice perimeter geometries.

Figure 4:
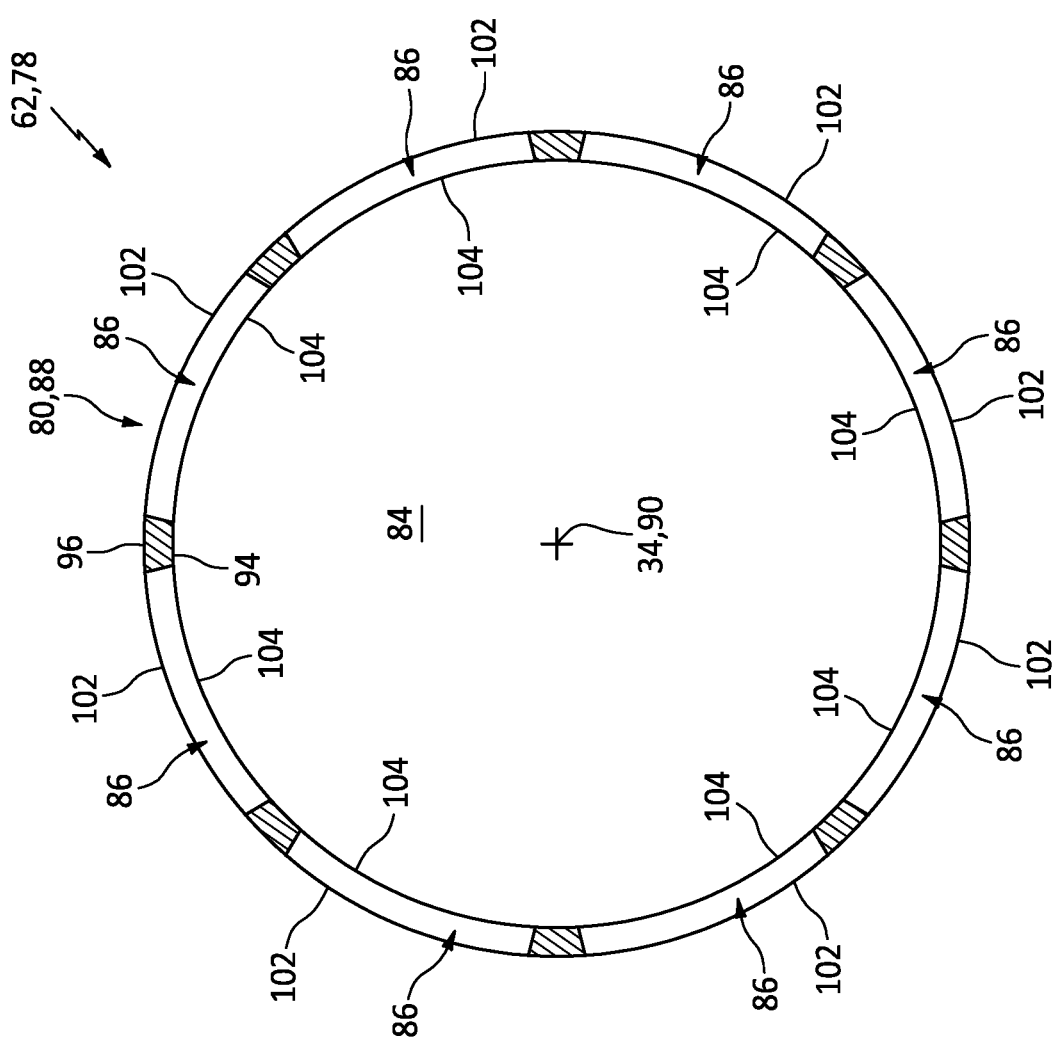
FIG. 4 is a cross-sectional illustration of an inlet structure of the variable area inlet, which is shown without the inlet door for ease of illustration, in accordance with one or more embodiments of the present disclosure.

Referring to FIGS. 2 and 4, the outer inlet passages 86 are disposed circumferentially about the longitudinal centerline 90 and the inner inlet passage 84 in an array (e.g., a circular array). Each of the outer inlet passages 86 of FIG. 2 is aft and/or downstream of the leading edge 92. Each of the outer inlet passages 86, for example, is longitudinally spaced from the leading edge 92 and the inner inlet orifice 98 by a non-zero longitudinal distance. With such an arrangement, a portion (e.g., upstream and/or forward tubular portion) of the inlet structure 80 separates the inner inlet passage 84 from the outer inlet passages 86. The outer inlet passages 86 are positioned relative to the fan rotor 52 so as to minimize flow distortion of air directed into the fan rotor 52 face (e.g., upstream-facing surfaces of the fan rotor 52).

Each of the outer inlet passages 86 may be configured as a port in the inlet structure 80 and its sidewall 88. Each of the outer inlet passages 86, for example, may extend through the inlet structure 80 to the inner inlet passage 84. Each outer inlet passage 86 of FIG. 4, in particular, extends radially inward (e.g., in a direction towards the longitudinal centerline 90) from an outer inlet orifice 102 into that respective outer inlet passage 86, through the sidewall 88, to an outer outlet orifice 104 from that respective outer inlet passage 86. The outer inlet orifice 102 is disposed at and, more particularly, may be formed in a surface of the inlet structure 80 at its outer side 96. The outer outlet orifice 104 is disposed at and, more particularly, may be formed in a surface of the inlet structure 80 at its inner side 94. The outer outlet orifice 104 is adjacent an outer periphery of the inner inlet passage 84. Each outer inlet passage 86 may thereby be (e.g., directly) fluidly coupled with the inner inlet passage 84 through the respective outer outlet orifice 104.

Figure 6:
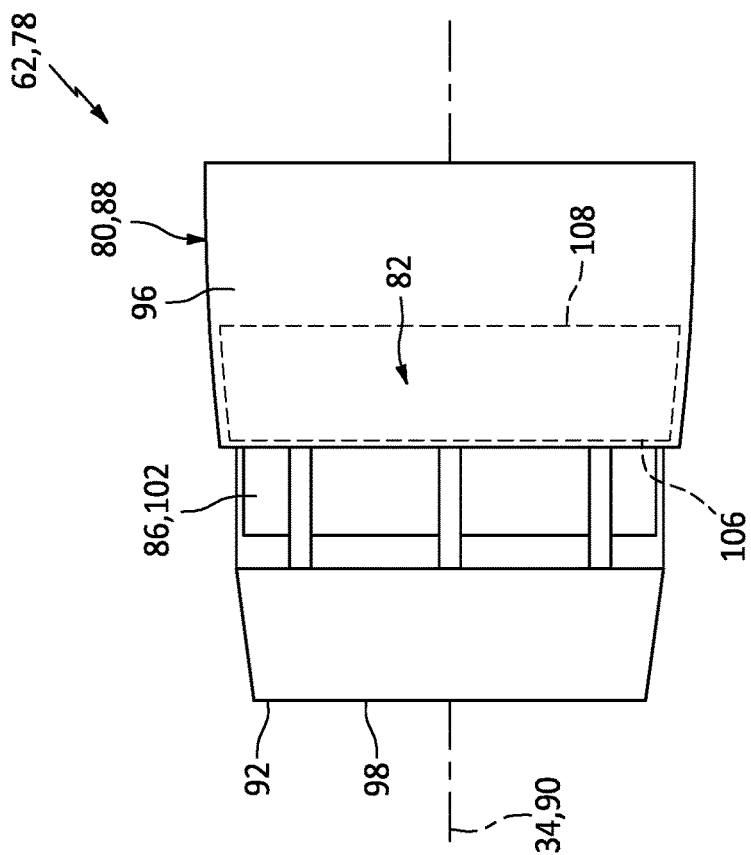
FIG. 6 is a side view illustration of the variable area inlet with its inlet door in the open position, in accordance with one or more embodiments of the present disclosure.

Referring to FIGS. 1 and 2, the inlet door 82 extends circumferentially about (e.g., completely around) the longitudinal centerline 90 and the inner inlet passage 84. For example, the inlet door 82 may be an annular inlet door. The inlet door 82 extends (e.g., axially extends) between and to a leading edge 106 of the inlet door 82 and a trailing edge 108 of the inlet door 82. The inlet door 82 includes an outer side 110 (e.g., an outer radial side) extending between and to the leading edge 106 and the trailing edge 108. The outer side 110 has an outer perimeter 112 (e.g., an outer periphery of a cross-sectional geometry) when viewed in a reference plane, for example, perpendicular to the longitudinal centerline 90. The outer perimeter 112 may be the same as or substantially the same as the outer perimeter 100. For example, the outer perimeter 112 may have a curvilinear shape, a partially curvilinear and a partially polygonal shape, a polygonal shape, etc., and the present disclosure is not limited to the foregoing exemplary outer perimeter 112 geometries. The inlet door 82 is configured to move between a closed (e.g., stowed, forward, and/or supersonic) position and an open (e.g., deployed, aft, and/or subsonic) position; see also FIGS. 5 and 6. The inlet door 82, may be movably mounted to the inlet structure 80, or alternatively to another (e.g., fixed) structure of the propulsion system 20, and configured to translate (e.g., axially translate) relative to the inlet structure 80, or alternatively to another (e.g., fixed) structure of the propulsion system 20. The inlet door 82 may thereby translate axially along the longitudinal centerline 90 from the closed position of FIGS. 1 and 5 to the open position of FIGS. 2 and 6. With such an arrangement, the variable area inlet 78 may reduce or eliminate overhung mass in both the closed and open positions compared to known variable area inlets.

Figure 5:
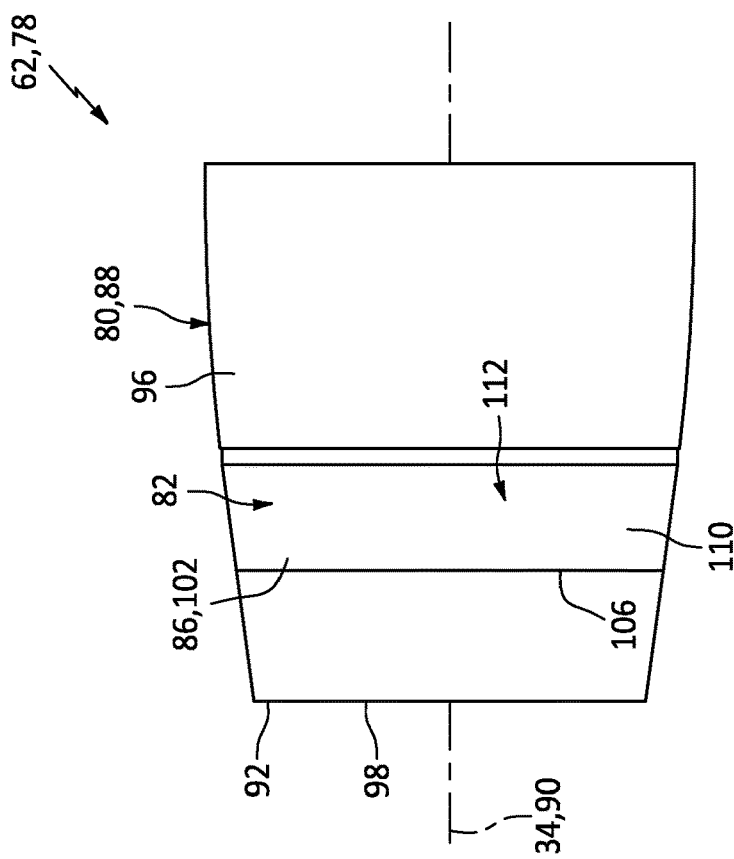
FIG. 5 is a side view illustration of the variable area inlet with its inlet door in the closed position, in accordance with one or more embodiments of the present disclosure.

With the inlet door 82 in its closed (e.g., fully closed) position of FIGS. 1 and 5, the inlet door 82 is configured to close (e.g., cover, plug, or otherwise obstruct and/or seal off) each of the outer inlet passages 86 and each respective outer inlet orifice 102. In this closed position, the outer side 110 may be disposed coincident with the outer side 96. In this closed position, the leading edge 106 may contact (e.g., sealingly contact) or otherwise be disposed at (e.g., on, adjacent, or proximate) the tubular sidewall 88. With the variable area inlet 78 in this closed-door arrangement, the variable area inlet 78 may have a first inlet area that is equal to (e.g., only including) an inlet area of the inner inlet orifice 98. The gas turbine engine 22 and its flowpath(s) 48 and/or 66 (see FIG. 1) may thereby (e.g., only) receive incoming air from the inner inlet orifice 98. In contrast, with the inlet door 82 in its open (e.g., fully open) position of FIGS. 2 and 6, the inlet door 82 is configured to open (e.g., uncover, unplug, or otherwise facilitate access to) each of the outer inlet passages 86 and each respective outer inlet orifice 102. In this open position, the leading edge 106 may be axially displaced from the outer inlet passages 86. For example, in the open position, the leading edge 106 may be disposed axially aft of the outer inlet passages 86. With the variable area inlet 78 in this open-door arrangement, the variable area inlet 78 may have a second (e.g., greater) inlet area that is equal to the inlet area of the inner inlet orifice 98 plus inlet areas of the open outer inlet orifices 102. The gas turbine engine 22 and its flowpath(s) 48 and/or 66 (see FIG. 2) may thereby receive incoming air from each (e.g., open) outer inlet passage 86 and its outer inlet orifice 102 in addition to the incoming air from the inner inlet orifice 98. Thus, by moving (e.g., translating) between the closed position of FIGS. 1 and 5 and the open position of FIGS. 2 and 6, the variable area inlet 78 and its inlet door 82 may selectively change the incoming air mass flow into the propulsion system 20.

While operation of the inlet door 82 is discussed above as moving between the closed (e.g., fully closed) position and the open (e.g., fully open) position (e.g., see FIGS. 1 and 2), the inlet door 82 may also (or may not) move to and stop (or otherwise pause) at one or more intermediate positions (e.g., partially open positions) between the closed position and the open position. In this manner, the variable area inlet 78 may tailor the incoming air mass flow based on different conditions, aircraft speeds, maneuvers, etc.

The inlet door 82 may be translated or otherwise moved between its open position and its closed position via one or more actuators (not shown). The actuator(s) may be electric motor(s), pneumatic drive(s), and/or hydraulic cylinder(s). These actuator(s), for example, may be linear actuators.

In some embodiments, the inlet door 82 may be configured with one or more locks (e.g., dedicated locks) to lock the inlet door 82 (e.g., the leading edge 106 or an upstream portion of the inlet door 82) into one or more positions; e.g., the open position, the closed position, and/or one or more intermediate positions. In addition or alternatively, the actuator(s) may include one or more integral locks for maintaining the position of the inlet door 82.

Figure 7:
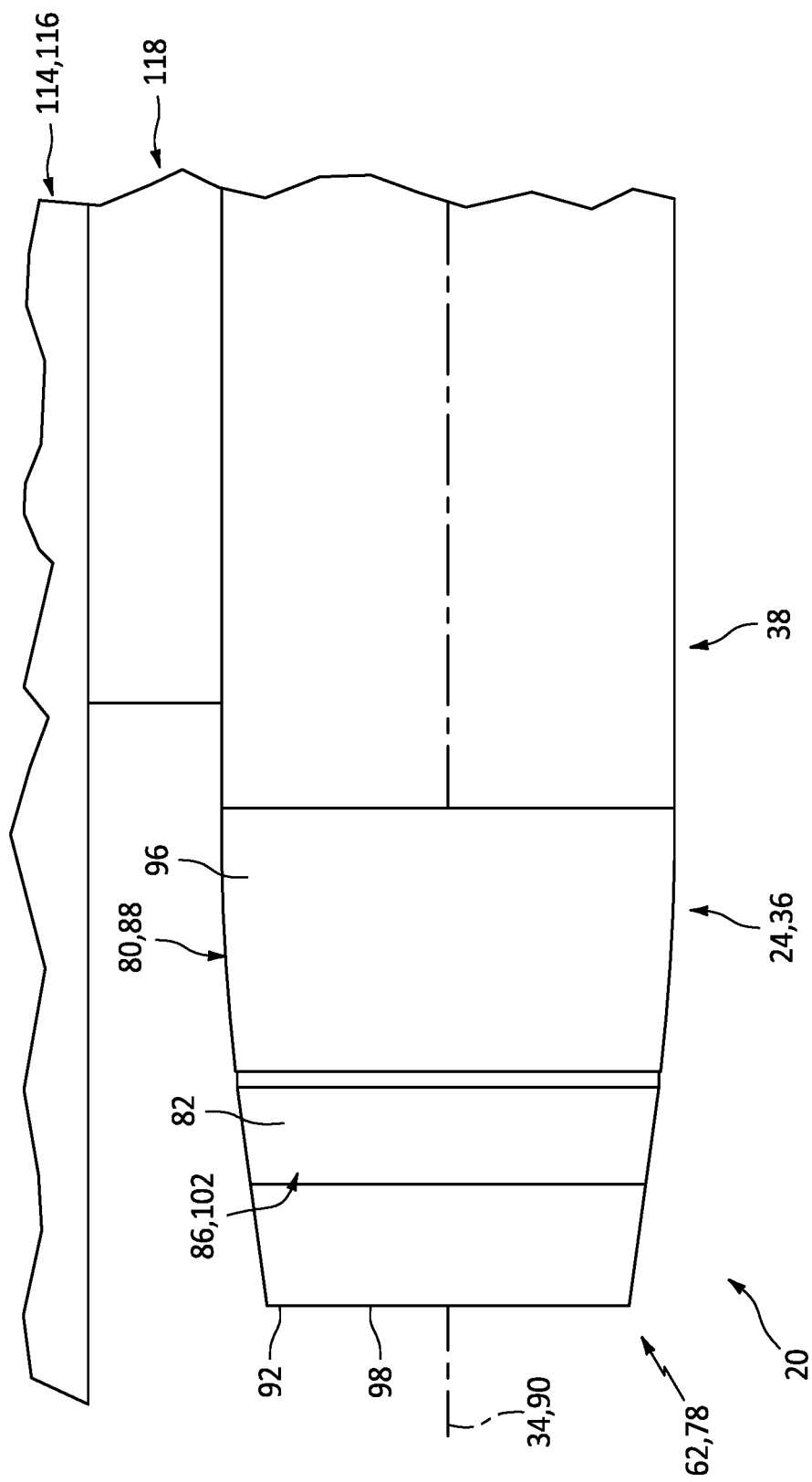
FIG. 7 is a partial illustration of the aircraft propulsion system mounted to an airframe component, in accordance with one or more embodiments of the present disclosure.

In some embodiments, referring to FIG. 7, the propulsion system 20 may be arranged exterior of an airframe 114 of the aircraft. The propulsion system 20, for example, may be located outside of the aircraft airframe 114, and mounted to an exterior of the aircraft airframe 114. The aircraft propulsion system 20 of FIG. 7, in particular, is mounted to a component 116 of the aircraft airframe 114 by a mount 118 (e.g., a pylon). Examples of the airframe component 116 include, but are not limited to, a wing and a fuselage. With such an arrangement, the variable area inlet 78 is configured discrete (e.g., remote, spaced, etc.) from the aircraft airframe 114 and its airframe component 116. The outer inlet passages 86 may thereby be distributed (e.g., uniformly, symmetrically, etc.) about the centerline 34, 90. The gas turbine engine 22 and its fan section 26 (see FIG. 2) may thereby receive a relatively even distribution of incoming air.

In some embodiments, a command to open or close the inlet door 82 may be provided with one or more redundancies and/or safety measures. The command may be issued (e.g., generated) using an open-loop control system or a closed-loop control system. Movement of the inlet door 82 may be triggered based on one or more parameters. Examples of these parameters include, but are not limited to: position of the aircraft (e.g., on ground, in air); airspeed of the aircraft; fan pressure input; aircraft speed; and operator input (e.g., a command from a pilot). Actuation of the inlet door 82 may also or alternatively be based on system health. For example, if it is determined the inlet door 82 cannot close, the control system may prevent (or warn against) operating the aircraft at certain or any supersonic speeds. Conversely, if it is determined the inlet door 82 cannot open, the control system may prevent (or warn against) proceeding to takeoff where the aircraft is still on ground.

The aircraft propulsion system 20 and its variable area inlet 78 may be configured with various gas turbine engines other than the exemplary one described above with respect to FIGS. 1 and 2. The gas turbine engine, for example, may be configured as a geared engine or a direct drive engine. The gas turbine engine may be configured with a single spool, with two spools (e.g., see FIGS. 1 and 2), or with more than two spools. The gas turbine engine may be configured as a turbofan engine, a turbojet engine or any other type of turbine engine. The present disclosure therefore is not limited to any particular types or configurations of gas turbine engines. The present disclosure is also not limited to applications where the aircraft is capable to traveling supersonic speeds. The variable area inlet 78, for example, may be utilized at subsonic speeds to, for example, increase ram air intake for certain flight conditions and/or aircraft maneuvers.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

What is claimed is:

1. An assembly for an aircraft, the assembly comprising:
   a variable area inlet for an aircraft propulsion system, the variable area inlet extending along a longitudinal centerline, the variable area inlet including an inlet structure, an inlet door, an inner inlet passage, and a plurality a outer inlet passages distributed circumferentially about the longitudinal centerline;
   the inlet door configured to axially translate from a closed position to an open position along the longitudinal centerline, the inlet door configured to close the plurality of outer inlet passages when the inlet door is in the closed position, and the inlet door configured to open the plurality of outer inlet passages when the inlet door is in the open position;
   the inner inlet passage extending into the variable area inlet from a leading edge of the inlet structure; and
   each of the plurality of outer inlet passage extending through the inlet structure to the inner inlet passage.

2. The assembly of claim 1, wherein the inlet door is downstream of the leading edge.

3. The assembly of claim 1, wherein the inlet door is configured to:
   cover an inlet orifice into each of the plurality of outer inlet passages when the inlet door is in the closed position; and
   uncover the inlet orifice when the inlet door is in the open position.

4. The assembly of claim 1, wherein:
   an inner inlet orifice into the inner inlet passage is formed by the inlet structure at the leading edge; and
   an outer inlet orifice into each of the plurality of outer inlet passages is formed by the inlet structure downstream of the leading edge.

5. The assembly of claim 1, wherein the inner inlet passage extends axially into the variable area inlet from the leading edge.

6. The assembly of claim 1, wherein each of the plurality of outer inlet passage extends radially through the inlet structure to the inner inlet passage.

7. The assembly of claim 1, wherein the inlet door includes a door exterior side extending circumferentially about the longitudinal centerline.

8. The assembly of claim 7, wherein the inlet structure includes an inlet exterior side, the door exterior side disposed contiguous with the inlet exterior side with the inlet door in the closed position.

9. The assembly of claim 7, wherein the inlet door includes a leading edge and a trailing edge and the leading edge contacts the inlet structure with the inlet door in the closed position.

10. The assembly of claim 9, wherein the leading edge is axially displaced from the plurality of outer inlet passages with the inlet door in the open position.

11. The assembly of claim 1, further comprising:
    a gas turbine engine including a core flowpath;
    the core flowpath configured to receive air from the inner inlet passage and the outer inlet passages when the inlet door is in the open position.

12. The assembly of claim 1, further comprising:
    a gas turbine engine including a bypass flowpath;
    the bypass flowpath configured to receive air from the inner inlet passage and the plurality of outer inlet passages when the inlet door is in the open position.

13. An assembly for an aircraft, the assembly comprising:
    a variable area inlet for an aircraft propulsion system, the variable area inlet extending circumferentially about a longitudinal centerline, the variable area inlet including an inlet structure, an inlet door, an inner inlet passage and a plurality of outer inlet passages, the plurality of outer inlet passages disposed circumferentially about the longitudinal centerline and the inner inlet passage in an array;
    the inlet door configured to translate between a closed position and an open position, the inlet door configured to close each of the plurality of outer inlet passages when the inlet door is in the closed position, and the inlet door configured to open each of the plurality of outer inlet passages when the inlet door is in the open position;
    the inner inlet passage extending axially into the variable area inlet; and
    the plurality of outer inlet passages extending radially through the inlet structure.

14. The assembly of claim 13, wherein the inlet door extends circumferentially about the longitudinal centerline.

15. The assembly of claim 14, wherein the inlet door extends circumferentially about the inner inlet passage.

16. An assembly for an aircraft, the assembly comprising:
    a variable area inlet for an aircraft propulsion system, the variable area inlet extending along a longitudinal centerline, the variable area inlet including an inlet structure, an inlet door, an inner inlet passage, and a plurality of outer inlet passages distributed circumferentially about the longitudinal centerline;

the inlet door including a leading edge and a trailing edge, the inlet door configured to axially translate from a closed position to an open position along the longitudinal centerline, the leading edge disposed in contact with the inlet structure in the closed position, and the leading edge axially displaced from the plurality of outer inlet passages in the open position;

the inner inlet passage extending into the variable area inlet from a leading edge of the inlet structure; and each of the plurality of outer inlet passage extending through the inlet structure to the inner inlet passage.

17. The assembly of claim 16, wherein:

an inner inlet orifice into the inner inlet passage is formed by the inlet structure at the leading edge; and an outer inlet orifice into each of the plurality of outer inlet passages is formed by the inlet structure downstream of the leading edge.

18. The assembly of claim 16, wherein the inner inlet passage extends axially into the variable area inlet from the leading edge.

19. The assembly of claim 16, wherein each of the plurality of outer inlet passages extends radially through the inlet structure to the inner inlet passage.

* * * * *